United States Patent
Li et al.

(10) Patent No.: US 11,514,220 B2
(45) Date of Patent: Nov. 29, 2022

(54) PREDICTING POWER USAGE OF A CHIP

(71) Applicant: International Business Machines Corporation, Armonk, NY (US)

(72) Inventors: Zhichao Li, Austin, TX (US); Yaoguang Wei, Redmond, WA (US); Kai Liu, Malden, MA (US); Su Liu, Austin, TX (US); Manjunath Ravi, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 996 days.

(21) Appl. No.: 16/243,362

(22) Filed: Jan. 9, 2019

(65) Prior Publication Data

US 2020/0218958 A1  Jul. 9, 2020

(51) Int. Cl.
| | | |
|---|---|---|
| *G06F 30/30* | (2020.01) | |
| *G06F 30/392* | (2020.01) | |
| *G06F 30/394* | (2020.01) | |
| *G06F 30/398* | (2020.01) | |
| *G06F 30/27* | (2020.01) | |
| *G06F 119/06* | (2020.01) | |

(52) U.S. Cl.
CPC ............ *G06F 30/392* (2020.01); *G06F 30/27* (2020.01); *G06F 30/394* (2020.01); *G06F 30/398* (2020.01); *G06F 2119/06* (2020.01)

(58) Field of Classification Search
None
See application file for complete search history.

(56) References Cited

U.S. PATENT DOCUMENTS

| | | | |
|---|---|---|---|
| 7,693,670 B2 | 4/2010 | Durling et al. | |
| 8,751,421 B2 | 6/2014 | Anderson et al. | |
| 9,021,409 B2 | 4/2015 | Vasudevan et al. | |
| 9,417,984 B1 | 8/2016 | Drury et al. | |
| 9,547,316 B2 | 1/2017 | Shilts et al. | |
| 10,372,859 B2* | 8/2019 | Nagaraja | G06F 30/3323 |
| 10,678,973 B2* | 6/2020 | Chuang | G06F 30/27 |
| 10,699,043 B2* | 6/2020 | Ho | G06F 30/392 |
| 10,733,350 B1* | 8/2020 | Prasad | G06F 30/33 |
| 11,100,266 B2* | 8/2021 | Ho | G06F 30/27 |
| 2007/0276645 A1* | 11/2007 | Veller | G06F 30/33 |
| | | | 703/18 |
| 2009/0045804 A1 | 2/2009 | Durling et al. | |

(Continued)

FOREIGN PATENT DOCUMENTS

WO  WO-2017/183029 A1  10/2017

OTHER PUBLICATIONS

Colak et al., *Data mining and wind power prediction: A literature review*, Renewable Energy International Journal, vol. 46, Oct. 2012, pp. 241-247, ScienceDirect.com (online), URL: www.sciencedirect.com/science/article/pii/S0960148112001541?via%3Dihub.

(Continued)

*Primary Examiner* — Leigh M Garbowski
(74) *Attorney, Agent, or Firm* — Teddi Maranzano

(57) ABSTRACT

Predicting power usage of a chip may include receiving placement data describing a placement, within the chip, of a plurality of logical components of the chip; providing the placement data as an input to a neural network; and determining, by the neural network, based on the placement data, a predicted power usage of the chip.

20 Claims, 5 Drawing Sheets

(56) References Cited

U.S. PATENT DOCUMENTS

| | | | |
|---|---|---|---|
| 2012/0060133 A1 | 3/2012 | Krishnan | |
| 2013/0144451 A1 | 6/2013 | Kumar et al. | |
| 2013/0232094 A1 | 9/2013 | Anderson et al. | |
| 2014/0074300 A1 | 3/2014 | Shilts et al. | |
| 2016/0117436 A1* | 4/2016 | Ng | G06F 30/327 716/113 |
| 2017/0193136 A1* | 7/2017 | Prasad | G06F 30/327 |
| 2018/0003746 A1 | 1/2018 | Patel et al. | |
| 2019/0026625 A1* | 1/2019 | Vorenkamp | G06N 3/08 |

OTHER PUBLICATIONS

Li et al., *Machine Learning in Physical Design*, 25th Conference on Electrical Performance of Electronic Packages and Systems, Oct. 2016, 3 pages, University of Illinois (online), URL: jsa.ece.illinois.edu/epeps/papers/6.pdf.

Franzon, *Machine Learning for Next Generation EDA*, Electronic Design Process Symposium, Sep. 2017, 40 pages, Milpitas, California.

Chan et al., *BEOL Stack-Aware Routability Prediction From Placement Using Data Mining Techniques*, 2016 IEEE 34th International Conference on Computer Design (ICCD), Oct. 2016, 8 pages, IEEE Xplore Digital Library (online) Nov. 2016, DOI: 10.1109/ICCD.2016.7753259.

Yang et al., *Early Stage Real-Time SoC Power Estimation Using RTL Instrumentation*, The 20th Asia and South Pacific Design Automation Conference, Session 9A-4, Jan. 2015, pp. 779-784, IEEE Xplore Digital Library (online) Mar. 2015, DOI: 10.1109/ASPDAC.2015.7059105.

Kapre et al., *Driving Timing Convergence of FPGA Designs through Machine Learning and Cloud Computing*, 2015 IEEE 23rd Annual International Symposium on Field-Programmable Custom Computing Machines, May 2015, pp. 119-126, IEEE Xplore Digital Library (online) Jul. 2015, DOI: 10.1109/FCCM.2015.36.

\* cited by examiner

PREDICTING POWER USAGE OF A CHIP

BACKGROUND

Field of the Invention

The field of the invention is data processing, or, more specifically, methods, apparatus, and products for predicting power usage of a chip.

Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The development process of a chip may include many phases. During the placement phase, the locations of logical components (e.g., gates, switches, clocks, memory, etc.) on the chip are determined. After placement, during the clocking phase, connections between clocks and clocked components are determined, as well as clock frequencies. During the routing phase, the locations and paths of wires and channels connecting all of the logical components is determined.

The power usage of the chip (e.g., power leakage, minimum power usage, maximum power usage, average power usage, etc.) may be measured to determine if the chip meets power usage goals or standards. If the chip does not meet these goals, the design of the chip must be modified. When the power usage is measured after the placement, clocking, and routing phases, a change in the design would require all phases to be repeated, resulting in a loss of manpower and resources. Existing solutions to accurately estimate the power usage (e.g., before the chip has been fully designed and tested) are inaccurate.

SUMMARY

Predicting power usage of a chip may include receiving placement data describing a placement, within the chip, of a plurality of logical components of the chip; providing the placement data as an input to a neural network; and determining, by the neural network, based on the placement data, a predicted power usage of the chip.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
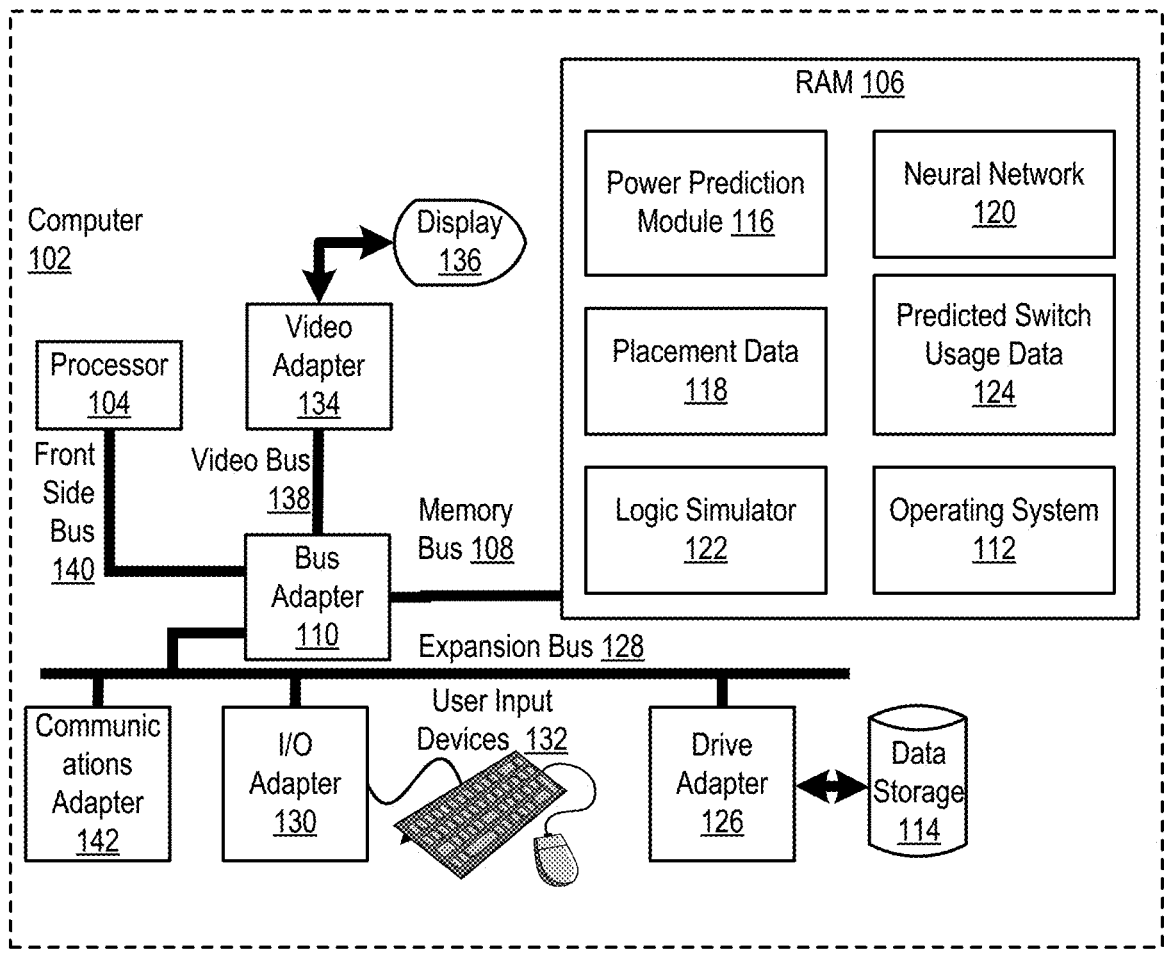
FIG. 1 is a block diagram of a computer for predicting power usage of a chip.

Predicting power usage of a chip in accordance with the present invention is generally implemented with computers, that is, with automated computing machinery. For further explanation, therefore, FIG. 1 sets forth a block diagram of automated computing machinery comprising an exemplary computer 102 configured for predicting power usage of a chip according to embodiments of the present invention. The computer 102 of FIG. 1 includes at least one computer processor 104 or 'CPU' as well as random access memory 106 ('RAM') which is connected through a high speed memory bus 108 and bus adapter 110 to processor 104 and to other components of the computer 102.

Stored in RAM 106 is an operating system 112. Operating systems useful in computers configured for Predicting power usage of a chip according to embodiments of the present invention include UNIX™, Linux™, Microsoft Windows™, AIX™, IBM's i OS™, and others as will occur to those of skill in the art. The operating system 112 in the example of FIG. 1 is shown in RAM 106, but many components of such software typically are stored in non-volatile memory also, such as, for example, on data storage 114, such as a disk drive. Also stored in RAM is a power prediction module 116, a module for predicting power usage of a chip according to embodiments of the present invention.

The power prediction module 116 may be configured to receive placement data 118 describing the placement (e.g., a location), within a chip (e.g., an integrated circuit, a field programmable gate array, a system-on-a-chip, a processor), of a plurality of logical components of the chip. Such logical components can include switches, latches, gates, memory, clocks, etc. The placement data may be encoded as VHSIC Hardware Description Language (VHDL) data. The placement data mat be received as a user input (e.g., via a user interface), loaded from data storage, or otherwise deceived. The placement data 118 may describe the placement of the plurality of logical components within the chip in an unrouted state. In other words, the placement data 118 may exclude data describing the routing of the plurality of logical components within the chip.

The power prediction module 116 may then provide the placement data 118 as input to a neural network 120. The neural network 120 may comprise a plurality of layers including the input layer configured to receive, as input, the placement data 118. The neural network 120 may also comprise a scaling layer to normalize one or more values of the input layer. For example, a value X may be normalized to a value X' according to the function $X'=(X-X_{min})/(X_{max}-X_{min})$, or according to another normalization function.

The neural network 120 may also include one or more hidden layers (e.g., intermediate layers, convolutional layers) configured to facilitate generating an output of the neural network 120. The hidden layers may then be logically coupled to an output layer. Accordingly, the power prediction module 116 may be configured to determine, by the neural network 120, based on the placement data 118, a predicted power usage for the chip. Determining, by the neural network 120, the predicted power usage may comprise determining routing data associated with the chip. The routing data may describe wires, channels, or other physical connections between all logical components of the chip (e.g., as described in placement data 118). For the example, the routing data may map paths between the logical components of the chip as placed according to the placement data. The neural network 120 may then determine, based on the placement data and the determined routing data, the predicted power usage.

As the placement data 118 may describe the placement of the logical components of the chip in an unrouted state, the determination of the neural network is not directly based on input routing or clocking data. Thus, the power prediction module 116 may determine the predicted power usage of the chip after the placement phase of chip design. If the predicted power usage fails to meet a specification, standard, or desired result, only the placement of the logical components within the chip need be redesigned, avoiding time, labor, and resources that may be lost in having to repeat the clocking or routing phases that have yet to be performed.

Additional data may also be provided as input to the neural network 120 in order to determine the predicted power usage. A logic simulator 122 may generate predicted switch usage data 124 based on the placement data 118. The predicted switch usage data 124 describes predicted activity of the switches of a chip based on the placement data. Activity of switches may include a frequency of switch activation (e.g., how often a switch transitions between an activated and deactivated state) and/or a duration of switch activation (e.g., how long a switch is in an activated state). For example, the logic simulator 122 may apply one or more test cases to a chip (e.g., a simulated or prototype chip) based on the placement data. The one or more test cases may simulate the execution of various functions, operations, power loads, or other factors as applied to the chip. The logic simulator 122 will then monitor the activity of switches (e.g., latches, gates, etc.) of the chip to generate the switch usage data 124. The switch usage data 124 may then be provided as an input to the neural network 120. Accordingly, the neural network 120 may then determine the predicted power usage based on the placement data 118 and the predicted switch usage data 124.

In order for the neural network 120 to determine the predicted power usage, the neural network 120 may be trained. Accordingly, the power prediction module 116 may receive training data. The training data may comprise placement data for a plurality of other chips. The training data may also comprise power usage data (e.g., power leakage, average power usage, minimum power usage, maximum power usage data, etc.) of these other chips. The power usage data of the training data may comprise actual measured power usage data (e.g., not predicted power usage data) for the other chips. In other words, the training data comprises placement data and the associated power usage data for other chips. The training data may also comprise switch usage data of the other chips and associated with the power usage data. The training data may further comprise routing data of the other chips and associated with the power usage data.

The neural network 120 may then be trained based on the training data. The training the neural network 120 may be performed according to a cost function. For example, the cost function may comprise a mean absolute percentage error. Training the neural network 120 may also be performed according to a prediction function. The prediction function may also be based on a mean absolute percentage error.

The computer 102 of FIG. 1 includes disk drive adapter 126 coupled through expansion bus 128 and bus adapter 110 to processor 104 and other components of the computer 102. Disk drive adapter 126 connects non-volatile data storage to the computer 102 in the form of data storage 114. Disk drive adapters useful in computers configured for predicting power usage of a chip according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 102 of FIG. 1 includes one or more input/output ('I/O') adapters 130. I/O adapters implement user-oriented input/output through, for example, software drivers and computer hardware for controlling output to display devices such as computer display screens, as well as user input from user input devices 132 such as keyboards and mice. The example computer 102 of FIG. 1 includes a video adapter 134, which is an example of an I/O adapter specially designed for graphic output to a display device 136 such as a display screen or computer monitor. Video adapter 134 is connected to processor 104 through a high speed video bus 138, bus adapter 110, and the front side bus 140, which is also a high speed bus.

The exemplary computer 102 of FIG. 1 includes a communications adapter 142 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for Predicting power usage of a chip according to embodiments of the present invention include modems for wired dial-up communications, Ethernet (IEEE 802.3) adapters for wired data communications, and 802.11 adapters for wireless data communications.

Figure 2:
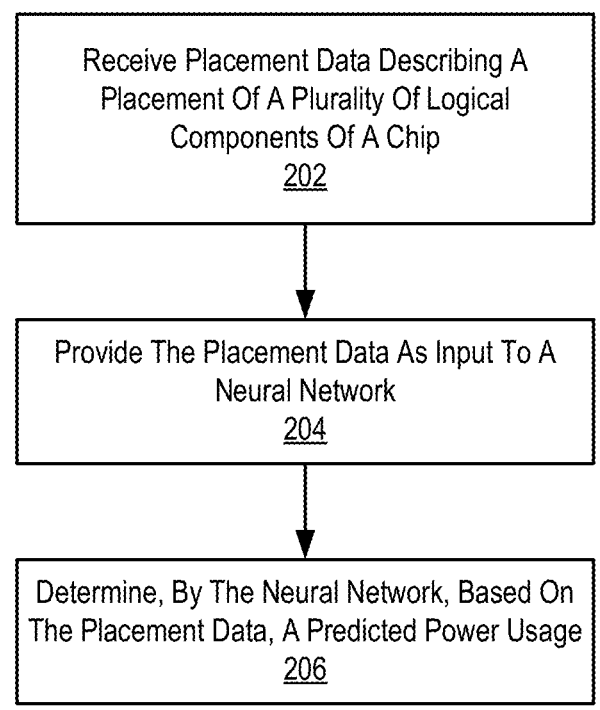
FIG. 2 is a flowchart of an example method for predicting power usage of a chip.

For further explanation, FIG. 2 sets forth a flow chart illustrating an exemplary method for predicting power usage by a chip according to embodiments of the present invention that includes receiving 202 placement data 118 describing the placement (e.g., a location), within a chip (e.g., an integrated circuit, a field programmable gate array, a system-on-a-chip, a processor), of a plurality of logical components of the chip. Such logical components can include switches, latches, gates, memory, clocks, etc. The placement data may be encoded as VHSIC Hardware Description Language (VHDL) data. The placement data mat be received as a user input (e.g., via a user interface), loaded from data storage, or otherwise deceived. The placement data 118 may describe the placement of the plurality of logical components within the chip in an unrouted state. In other words, the placement data 118 may exclude data describing the routing of the plurality of logical components within the chip.

The method of FIG. 2 may also comprise providing 204 the placement data 118 as input to a neural network 120. The neural network 120 may comprise a plurality of layers including the input layer configured to receive, as input, the placement data 118. The neural network 120 may also comprise a scaling layer to normalize one or more values of the input layer. For example, a value X may be normalized to a value X' according to the function $X'=(X-X_{min})/(X_{max}-X_{min})$, or according to another normalization function. The neural network 120 may also include one or more hidden layers (e.g., intermediate layers, convolutional layers) configured to facilitate generating an output of the neural network 120. The hidden layers may then be logically coupled to an output layer.

The method of FIG. 2 may further comprise determining 206, by the neural network 120, based on the placement data 118, a predicted power usage for the chip. Determining, by the neural network 120, the predicted power usage may comprise determining routing data associated with the chip. The routing data may describe wires, channels, or other physical connections between all logical components of the chip (e.g., as described in placement data 118). For the example, the routing data may map paths between the logical components of the chip as placed according to the placement data. The neural network 120 may then determine, based on the placement data and the determined routing data, the predicted power usage.

As the placement data 118 may describe the placement of the logical components of the chip in an unrouted state, the determination of the neural network is not directly based on routing or clocking data. Thus, the power prediction module 116 may determine the predicted power usage of the chip after the placement phase of chip design. If the predicted power usage fails to meet a specification, standard, or desired result, only the placement of the logical components within the chip need be redesigned, avoiding time, labor, and resources that may be lost in having to repeat the clocking or routing phases that have yet to be performed.

Figure 3:
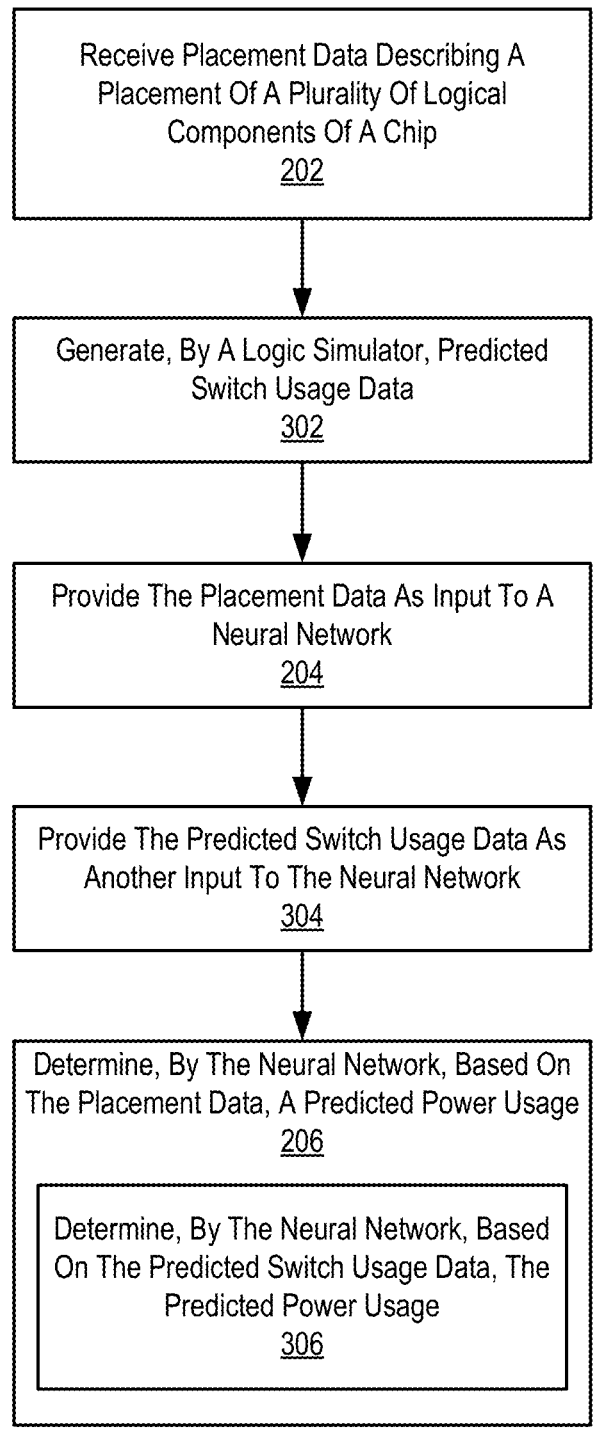
FIG. 3 is a flowchart of an example method for predicting power usage of a chip.

For further explanation, FIG. 3 sets forth a flow chart illustrating a further exemplary method for predicting power usage by a chip according to embodiments of the present invention that includes receiving 202 placement data 118 describing the placement, within a chip, of a plurality of logical components of the chip; providing 204 the placement data 118 as input to a neural network 120; and determining 206, by the neural network 120, based on the placement data 118, a predicted power usage for the chip.

The method of FIG. 3 differs from FIG. 2 in that the method of FIG. 3 further comprises generating 302 (e.g., by a logic simulator 122) predicted switch usage data 124 based on the placement data 118. The predicted switch usage data 124 describes predicted activity of the switches of a chip based on the placement data. Activity of switches may include a frequency of switch activation (e.g., how often a switch transitions between an activated and deactivated state) and/or a duration of switch activation (e.g., how long a switch is in an activated state). For example, the logic simulator 122 may apply one or more test cases to a chip (e.g., a simulated or prototype chip) based on the placement data. The one or more test cases may simulate the execution of various functions, operations, power loads, or other factors as applied to the chip. The logic simulator 122 will then monitor the activity of switches (e.g., latches, gates, etc.) of the chip to generate the switch usage data 124.

The method of FIG. 3 further differs from FIG. 2 in that the method of FIG. 3 comprises providing 304 the switch usage data 124 an input to the neural network 120. The method of FIG. 3 further differs from FIG. 2 in that determining 206, by the neural network 120, based on the placement data 118, the predicted power usage comprises determining 306, by the neural network 120, the predicted power usage based on the predicted switch usage data 124 (e.g., based on the predicted switch usage data 124 and the placement data 118).

Figure 4:
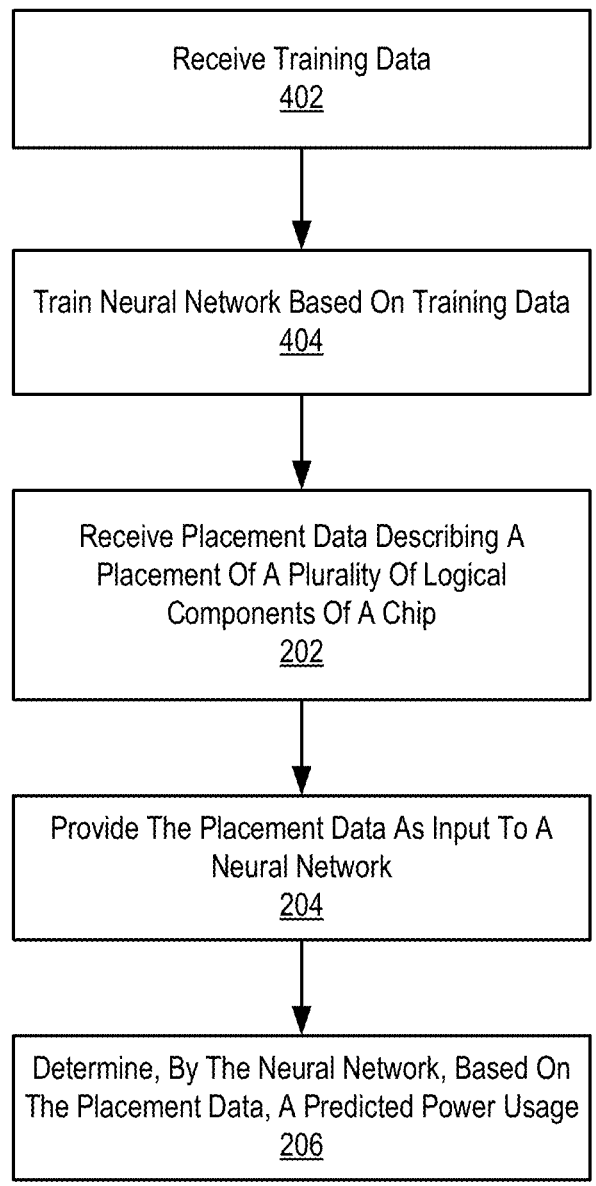
FIG. 4 is a flowchart of an example method for predicting power usage of a chip.

For further explanation, FIG. 4 sets forth a flow chart illustrating a further exemplary method for predicting power usage by a chip according to embodiments of the present invention that includes receiving 202 placement data 118 describing the placement, within a chip, of a plurality of logical components of the chip; providing 204 the placement data 118 as input to a neural network 120; and determining 206, by the neural network 120, based on the placement data 118, a predicted power usage for the chip.

The method of FIG. 4 differs from FIG. 2 in that the method of FIG. 4 further comprises receiving 402 training data. The training data may comprise placement data for a plurality of other chips. The training data may also comprise power usage data (e.g., power leakage, average power usage, minimum power usage, maximum power usage data, etc.) of these other chips. The power usage data of the training data may comprise actual measured power usage data (e.g., not predicted power usage data) for the other chips. In other words, the training data comprises placement data and the associated power usage data for other chips. The training data may also comprise switch usage data of the other chips and associated with the power usage data.

The method of FIG. 4 differs from FIG. 2 in that the method of FIG. 4 further comprises training 404 the neural network 120 based on the training data. The training the neural network 120 may be performed according to a cost function. For example, the cost function may comprise a mean absolute percentage error. Training the neural network 120 may also be performed according to a prediction function. The prediction function may also be based on a mean absolute percentage error.

Figure 5:
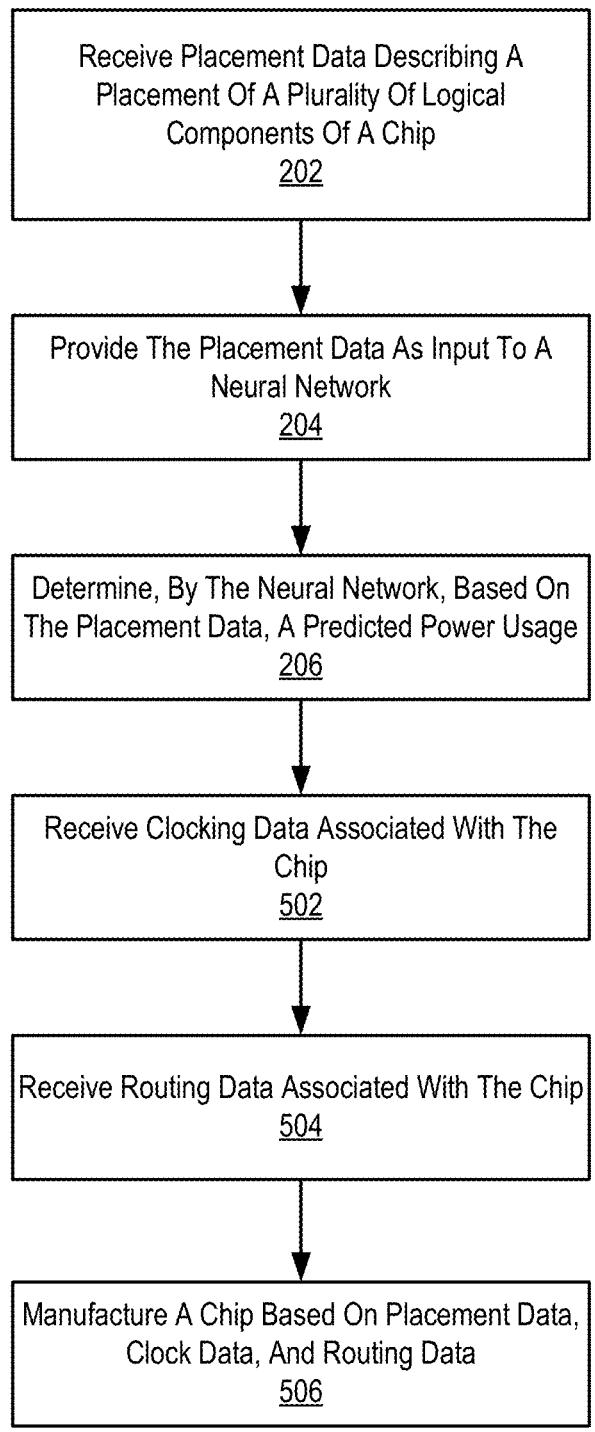
FIG. 5 is a flowchart of an example method for predicting power usage of a chip.

For further explanation, FIG. 5 sets forth a flow chart illustrating a further exemplary method for predicting power usage by a chip according to embodiments of the present invention that includes receiving 202 placement data 118 describing the placement, within a chip, of a plurality of logical components of the chip; providing 204 the placement data 118 as input to a neural network 120; and determining 206, by the neural network 120, based on the placement data 118, a predicted power usage for the chip.

The method of FIG. 5 differs from FIG. 2 in that the method of FIG. 5 further comprises receiving 502 clocking data associated with the chip. The clocking data may describe connections between clocks of the chip and clockable logical components of the chip (e.g., switches, latches, etc. as described in placement data 118). The clocking data may also describe a frequency or other operational parameter of the clocks of the chip. The clocking data may be encoded as VHSIC Hardware Description Language (VHDL) data. The clocking data mat be received as a user input (e.g., via a user interface), loaded from data storage, or otherwise deceived.

The method of FIG. 5 differs from FIG. 2 in that the method of FIG. 5 further comprises receiving 504 routing data associated with the chip. The routing data may describe wires, channels, or other physical connections between all logical components of the chip (e.g., as described in placement data 118). For the example, the routing data may map paths between the logical components of the chip as placed according to the placement data. The placement data may be encoded as VHSIC Hardware Description Language (VHDL) data. The placement data mat be received as a user input (e.g., via a user interface), loaded from data storage, or otherwise deceived.

The received routing data may comprise routing data generated by the neural network 120 (e.g., generated while determining the predicted power usage of the chip). The received routing data may also comprise a modified version of the routing data generated by the neural network 120 (e.g., subject to one or more modifications before being finalized for chip manufacture). Accordingly, the routing data may be received as a user input, loaded from a datastore, or otherwise received.

The method of FIG. 5 differs from FIG. 2 in that the method of FIG. 5 further comprises manufacturing 506 a chip based on the placement data, clock data, and routing data. For example, the logical components of the chip can be physically placed according to their placement as set forth in the placement data. The clockable logical components of the chip may be physically connected to clocks according to the clocking data. The clocks of the chip may be configured according to the clocking data. Physical channels of the chip may be included according to the routing data (e.g., wires connected, metal traces etched). Thus, the resulting manufactured chip has received the benefit of having power usage predicted before the clocking and routing stages of chip design and manufacture.

In view of the explanations set forth above, readers will recognize that the benefits of predicting power usage of a chip according to embodiments of the present invention include:
- A highly accurate method of predicting power usage of a chip through the use of a neural network.
- The ability to predict power usage of a chip after the placement stage, allowing refinements to the chip design to improve power usage to occur before the clocking and routing stage. Thus, when the chip design is refined to improve power usage, the clocking and routing stages need only be performed once, saving time and resources.

Exemplary embodiments of the present invention are described largely in the context of a fully functional computer system for predicting power usage of a chip. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of predicting power usage of a chip, the method comprising:
   receiving placement data describing a placement, within the chip, of a plurality of logical components of the chip;
   generating, based on the placement data, predicted switch usage data associated with the chip;
   providing the placement data and the predicted switch usage data as inputs to a neural network; and
   determining, by the neural network, based on the placement data and the predicted switch usage data, a predicted power usage of the chip.

2. The method of claim 1 further comprising:
   receiving training data comprising placement data for a plurality of other chips and power usage data for the plurality of other chips; and
   training, based on the training data, the neural network.

3. The method of claim 1, wherein generating, based on the placement data, the predicted switch usage data associated with the chip is performed by a logic simulator.

4. The method of claim 3, wherein the predicted switch usage data comprises one or more of a frequency of switch activation or a duration of switch activation.

5. The method of claim 1, further comprising manufacturing a chip based on the placement data.

6. The method of claim 5, further comprising:
   receiving clock data associated with the chip;
   receiving routing data associated with the chip; and
   wherein manufacturing the chip is further based on the clocking data and the routing data.

7. The method of claim 1, wherein the placement data describes the placement of the plurality of logical components in an unrouted state.

8. An apparatus for predicting power usage of a chip, the apparatus comprising a computer processor, a computer memory operatively coupled to the computer processor, the computer memory having disposed within it computer program instructions that, when executed by the computer processor, cause the apparatus to carry out the steps of:
   receiving placement data describing a placement, within the chip, of a plurality of logical components of the chip;
   providing the placement data as an input to a neural network, wherein the neural network is trained based on received placement data and power usage data for a plurality of other chips; and
   determining, by the neural network, based on the placement data, a predicted power usage of the chip.

9. The apparatus of claim 8, wherein the steps further comprising:
   receiving training data comprising placement data for a plurality of other chips and power usage data for the plurality of other chips; and
   training, based on the training data, the neural network.

10. The apparatus of claim 8, wherein the steps further comprising:
    generating, by a logic simulator, based on the placement data, predicted switch usage data associated with the chip;
    providing the predicted switch usage data as another input to the neural network; and
    wherein determining the predicted power usage of the chip is further based on the predicted switch usage data.

11. The apparatus of claim 10, wherein the predicted switch usage data comprises one or more of a frequency of switch activation or a duration of switch activation.

12. The apparatus of claim 8, wherein the steps further comprising manufacturing a chip based on the placement data.

13. The apparatus of claim 12, wherein the steps further comprise:
  receiving clock data associated with the chip;
  receiving routing data associated with the chip; and
  wherein manufacturing the chip is further based on the clocking data and the routing data.

14. The apparatus of claim 8, wherein the placement data describes the placement of the plurality of logical components in an unrouted state.

15. A computer program product for predicting power usage of a chip, the computer program product disposed upon a computer readable storage medium, the computer program product comprising computer program instructions that, when executed, cause a computer to carry out the steps of:
  receiving placement data describing a placement, within the chip, of a plurality of logical components of the chip;
  providing the placement data as an input to a neural network, wherein the neural network is trained based on received placement data and power usage data for a plurality of other chips; and
  determining, by the neural network, based on the placement data, a predicted power usage of the chip.

16. The computer program product of claim 15, wherein the steps further comprising:
  receiving training data comprising placement data for a plurality of other chips and power usage data for the plurality of other chips; and
  training, based on the training data, the neural network.

17. The computer program product of claim 15, wherein the steps further comprising:
  generating, by a logic simulator, based on the placement data, predicted switch usage data associated with the chip;
  providing the predicted switch usage data as another input to the neural network; and
  wherein determining the predicted power usage of the chip is further based on the predicted switch usage data.

18. The computer program product of claim 17, wherein the predicted switch usage data comprises one or more of a frequency of switch activation or a duration of switch activation.

19. The computer program product of claim 15, wherein the steps further comprising manufacturing a chip based on the placement data.

20. The computer program product of claim 19, wherein the steps further comprise:
  receiving clock data associated with the chip;
  receiving routing data associated with the chip; and
  wherein manufacturing the chip is further based on the clocking data and the routing data.

\* \* \* \* \*